Dec. 31, 1935. R. A. POWELL ET AL 2,026,320
MOTOR FOR WINDSHIELD WIPERS OF AUTOMOBILES OR THE LIKE
Filed Sept. 19, 1932 2 Sheets-Sheet 2
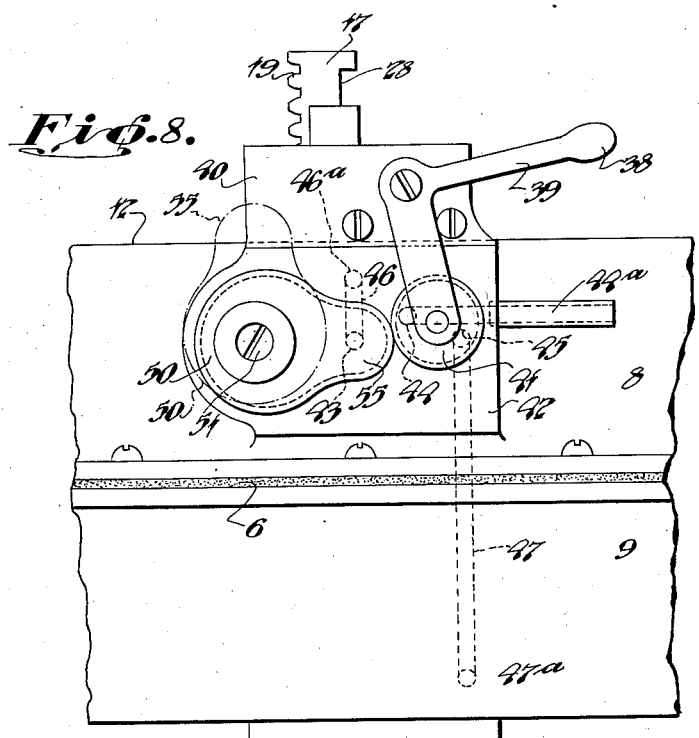
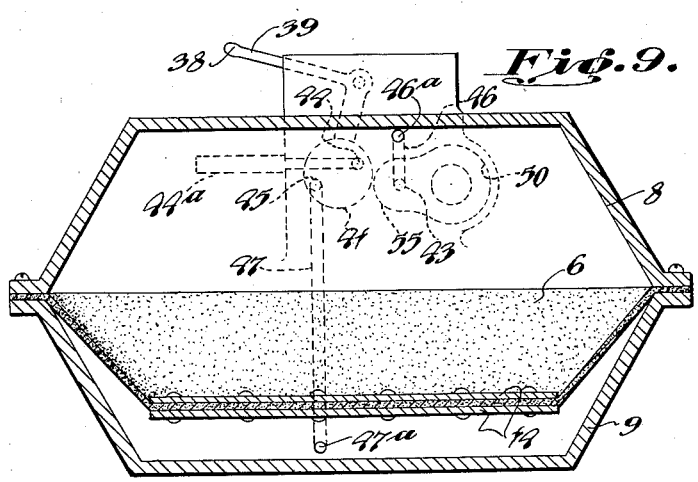
Inventor:-
Reginald Arthur Powell
and Roy William Newton
by E. F. Luichlwath
Atty.

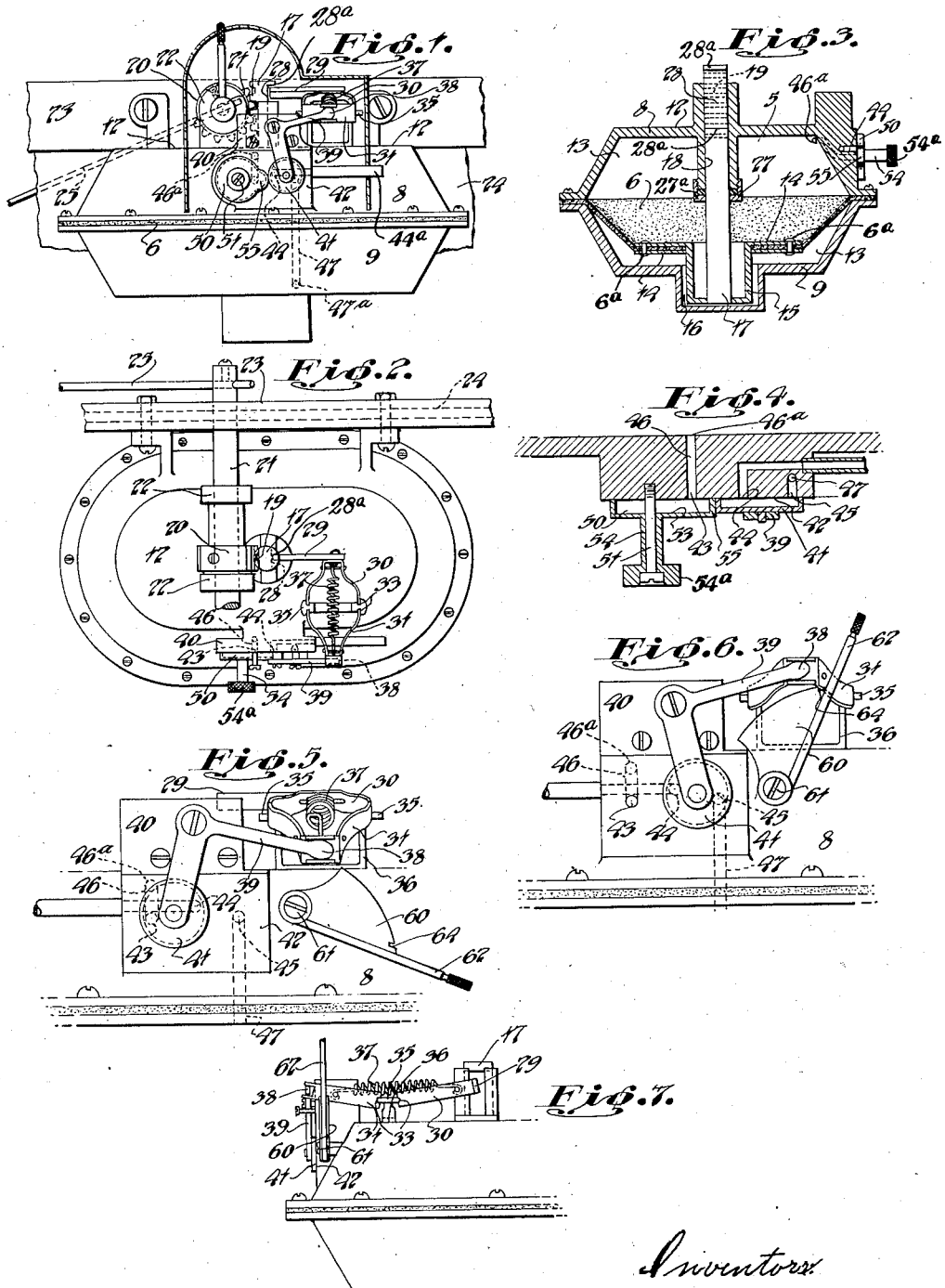

Patented Dec. 31, 1935

2,026,320

UNITED STATES PATENT OFFICE 2,026,320

MOTOR FOR WINDSHIELD WIPERS OF AUTOMOBILES OR THE LIKE

Reginald Arthur Powell and Roy William Newton, Collingwood, near Melbourne, Victoria, Australia, assignors to Patent Holdings Proprietary Limited, Melbourne, Australia Application September 19, 1932, Serial No. 633,880
In Australia August 11, 1932

4 Claims. (Cl. 121—48)

This invention has reference to an improved motor for windshield wipers for automobiles and the like and has been devised to provide an improved motor of the type described in our copending application Serial No. 629,704, dated August 20th, 1932, in which the movement obtained by the pulsations of a resilient and/or flexible diaphragm is converted into an arcuate reciprocating motion on the part of a wiper arm mounted in the usual manner on the surface of a windshield.

In wiper motors at present employed it is usual to employ valve mechanism to impart vacuum or fluid pressure alternately to each side of a leather actuator while separate manual valve control is provided for the said actuator whereby vacuum is imparted to one side only thereof to cause the motor to become inoperative, this principle of construction necessitating the duplication of valve mechanism and also an additional restricted vacuum chamber or pot on one side of the actuator, all of which considerably complicates the construction of the motor and greatly adds to its cost of production.

The object of this invention is to provide simple and effective means for starting and stopping the wiper motor, the said means being capable of manual manipulation to control the movement or action of the main or automatic valve mechanism of the wiper motor which is normally stationary whereby on the adjustment of the aforesaid means the valve mechanism is free to function and cause the wiper motor to operate for a required period.

The object of this invention is to improve and simplify the construction of a wiper motor of the class described and provide manually operable means to control automatic valve mechanism to start or stop the wiper motor at will, the stopping of the motor being adapted to return the wiper arm to an upper inoperative position clear of the vision of the driver.

A further object of the invention is to provide a wiper motor having automatic valve mechanism to impart vacuum alternately to each side of a flexible diaphragm to create a pulsating movement in the said diaphragm to operate a wiper arm, the automatic valve mechanism having manually operable control means to define the action of the said valve mechanism in order to start or stop the wiper motor at the will of the driver.

A still further object of the invention is to provide a wiper motor having manual means to control the movement or action of automatic valve mechanism which is adapted to impart vacuum alternately, each side of a flexible diaphragm positioned within the motor, the aforesaid means comprising manually operable cam mechanism included with the valve mechanism to be adjusted in order to either start or stop the wiper motor as a constant vacuum is maintained on the valve mechanism whereby on the cam mechanism being adjusted to prevent the functioning of the automatic valve mechanism, constant vacuum is imparted to one side only of the diaphragm which becomes inoperative and returns the wiper arm to an upper inoperative position.

A still further object of the invention is to provide manually adjustable cam mechanism to determine the movement of a slide valve adapted when in operation to impart vacuum alternately to each side of a flexible diaphragm, the valve mechanism being actuated by the rod of the diaphragm and the cam mechanism is adjusted to normally engage with the slide valve to prevent movement of same whereby a constant vacuum is imparted to one side only of the diaphragm to retain the motor stationary, while the adjustment of the cam mechanism to release the slide valve causes the diaphragm to pulsate and actuate the wiper arm by means of the gearing associated with the spindle of said diaphragm.

A still further object of the invention is to provide a cam having means to manipulate or adjust same in relation to a slide valve operating over a valve surface in order to impart vacuum alternately to each side of a flexible diaphragm, the valve surface being in communication with a constant source of vacuum and having a series of selective ports, two of which are covered at one instant by the slide valve whereby in the normal position of the cam the slide valve is retained over the main vacuum supply port and a port leading to one side only of the diaphragm which is thereby maintained inoperative and the wiper arm is retained in an upper stationary position.

Other objects and features of the invention will be apparent from the foregoing description in relation to the attached drawings wherein—

Figure 1 is a view in front elevation of the improved wiper motor.

Figure 2 is a plan thereof.

Figure 3 is a fragmentary section of the motor.

Figure 4 is a detail sectional view of the manual control means for the motor.

Figures 5 and 6 are detail views in front elevation of an alternative manual control means for the motor.

Figure 7 is a detail side elevation of Figure 5.

Figure 8 is an enlarged view illustrating the means for starting and stopping the wiper motor.

Figure 9 is a sectional view of the casing illustrating in detail the fluid passages associated with the valve mechanism.

According to one form of carrying the invention into practical effect the improved wiper motor comprises a recessed vacuum chamber 5 formed with two complemental sections 8 and 9 between which a flexible diaphragm 6 is positioned, the sections being flattened at their outer edges and fastened together as illustrated.

Each divided and complemental section 8 and 9 of the vacuum chamber is correspondingly shaped and provided with internally tapered walls 13 which, combined with the material of which the diaphragm 6 is composed, actually defines and limits the degree of flexibility of the diaphragm.

The diaphragm 6 is attached to plates 14, the upper of which is formed integral with an open cylinder 15 which depends into a recess 16 formed on the underside of the vacuum chamber 5 in the lower complemental section 9, the plates 14 being attached to the diaphragm 6 by means of spaced screws 6a or the like.

The diaphragm 6 has a vertical rod 17 attached thereto which extends upwardly through a bearing surface 18 formed in the upper section 8 and extending downwardly into the vacuum chamber 5, while the outer end of the rod 17 is formed with a rack surface 19 of predetermined length to engage with an oscillatory mutilated pinion 20 supported on a transverse spindle 21 carried in bearings 22 mounted on the upper flat surface 12 of section 8 and suitable fastening means are included to attach the motor to the frame of the windshield.

The spindle 21 of the oscillating pinion 20 is extended through the frame 23 of the windshield 24 to receive the squeegee-wiper arm 25 in the usual manner.

The lower end of the bearing surface 18 within the vacuum chamber is threaded to receive the screw cap 27a and gland 27 which are disposed around the spindle 17 to prevent leakage of air during the operation of the diaphragm 6 and its rod 17.

The upper extremity of the diaphragm rod 17 is formed with a recess 28 forming lugs 28a which is of equal length and oppositely disposed in relation to the rack surface 19, the said recess 28 being substantially rectangular and of a width to permit a projection to extend and seat therein.

The rod 17 of the diaphragm in its reciprocating motion under the pulsating influence of the diaphragm 6 actuates automatic valve mechanism 41 to impart vacuum alternately to each side of the said diaphragm as will be described.

The recess 28 forming lugs 28a is in constant engagement with a right angled projection or lug 29 formed on one end of pivoted and inclined spring controlled yokes 30 and 31, each yoke being united at one end and the said yokes 30 and 31 are adapted to pivot on a common centre, being inclined towards each other with their inner ends formed with grooves 33 to engage with each side of the upper flattened portions 35 of a channel shaped bracket 36 mounted on the upper flat surface 12 of the section 8.

The grooves 33 formed in the inner ends of the yokes 30 and 31 are adapted to seat on each edge of the flattened portions of the bracket as illustrated in Figures 1 and 2, the said yokes being inclined towards each other and are held apart by means of a tension spring 37 which is disposed between the said yoke and extends from an anchored position at each end or side thereof.

As previously described, the inner yoke 30 is provided with a right-angled extension or lug 29 which is in constant engagement with the recess 28 formed in the rod 17 of the diaphragm 6 while the other yoke 31 has its outer end bifurcated to receive the end 38 of a bell crank 39 which is pivoted to an upraised portion or block 40 formed on the outer casing of the upper complemental section 8 of the motor while the other and lower end of the bell crank 39 is pivoted to an automatic slide valve 41 of suitable dimensions which operates over a valve surface 42 formed on the lower surface of the vertical block 40.

The valve surface 42 is formed with three spaced and selective ports 43, 44 and 45, the centre port 44, being the main vacuum supply and having a tubular lead 44a to a source of vacuum such as the intake manifold, while the ports 43 and 45 on each side of the port 44 are provided with tubular leads 46 and 47 respectively, which extend to ports 46a and 47a in the chamber 5 of each divided member 8 and 9 forming the vacuum chamber.

The slide valve 41 is of such an area that it covers or selects two of the ports 43 and 44 or 44 and 45 at the one time whereby vacuum is passed continuously from the centre port 44 to one of the side ports 43 or 45 and as the slide valve reciprocates under the action of the bell crank, vacuum is imparted alternately to each side of the diaphragm in order to create a pulsating movement to cause the rod 17 of the diaphragm to reciprocate during which the rack 19 effects an oscillatory rotation by the mutilated pinion 20 to actuate the wiper arm 25 in an arcuate manner over the wind shield.

During the reciprocation of the diaphragm rod 17, the recess 28 forming shoulders 28a therein contacts intermittently with the lug 29 on the spring controlled snap-over yokes 30 and 31, which pivot together on a common centre in a constantly changing manner according to whether the slot 28 raises or lowers the lug 29 while the spring 37 energizes the yokes to effect the snap-over movement whereby the bell crank 39 actuates the slide valve 41 to operate over the valve surface 42 as previously described.

The invention comprehends the use of manually operable means to start and stop the motor at will, the said motor being normally retained in a stationary capacity by the said means which have to be released or adjusted in order to permit of the functioning of the automatic valve mechanism previously described.

In Figures 1 to 3 the manual control means for the motor comprise a recessed cam 50 which is adjustably mounted at one side of the valve surface 42 by means of a countersunk stud 51 which is threaded into the wall of the valve surface.

The cam 50 is recessed as at 53 and is eccentrically mounted in relation to the stud 51 and the projecting stem 54 of said cam is knurled as at 54a so as to be readily adjustable.

In the normal position the longer eccentric side 55 of the cam is positioned so as to extend over the effective area of the valve surface 42 and engage with the adjacent side of the slide valve 41 and thereby prevent any movement by the said valve 41 which is retained over the centre vacuum port 44 and the offside port 45 whereby a constant vacuum is maintained in the lower complemental section 9 of the main chamber 5 and consequently on one side only of the diaphragm 6 which is drawn into the lower section 9 and held stationary whereby the wiper arm is caused to assume an upper inoperative position clear of the vision of the driver.

In the normal position, as illustrated in Figures 1 and 4, when the cam 50 is in engagement with the oscillatory slide valve 41, the recess 53 in the cam covers the adjacent delivery port 43 and thereby eliminates any objectionable hiss or noise of air being drawn through said port 43 and 46a into the vacuum casing that would occur in the event of the diaphragm 6 becoming cracked or split and the port 43 was left exposed.

The cam 50 is freely rotatable on the stud 51 by means of the knurled stem and when it is desired to use the wiper, the cam is adjusted or partially rotated to effect the disengagement of its eccentric side from the slide valve 41 which is then free to reciprocate across the valve surface 42 in the manner previously described.

It will be understood that as a continuous vacuum is imparted through the centre port 44, immediately the cam 50 is released from the slide valve 41, the spring controlled snapover yokes 30 and 31 energize the said valve 41 which then moves and covers the previous open port 44 and imparts vacuum to the other side of the diaphragm 6 and thereby connects a continuous cycle of operations in which the diaphragm pulsates and actuates the wiper arm through the gearing described.

The cam 50 is therefore manipulated to control the automatic slide valve to either start or stop the motor and with each time the cam is moved to stop the motor by engaging with the slide valve as described, the rod 17 is always drawn into its maximum extent in order to return the wiper arm to an upper inoperative position.

In this manner manual control is provided for the wiper motor to co-act with the automatic valve mechanism, the necessity for valve duplication is obviated which greatly simplifies the construction of the wiper motor and its component parts, while the use of one set of valve mechanism only eliminates excessive porting in the vacuum chamber which is a decided commercial advantage.

As illustrated in Figures 5, 6 or 7, the cam mechanism for controlling the activity of the automatic valve mechanism, may engage with the exterior end of the spring controlled snapover yokes 30 and 31 and thereby prevent movement of same and retain the motor in an inoperative capacity, the said cam mechanism being manually operable for starting and stopping purposes as described.

The cam 60 in this construction is shaped in the arc of disc pivoted at its axis 61 to the wall of the upper complemental section 8 of the motor, the cam 60 having formed integral or attached thereto a handle 62 for adjustment and hand manipulation.

The periphery of the cam 60 has formed therein a notch 64 preferably at or near one end which is adapted to engage with one of the side arms of the spring controlled yokes 30 and 31 when in the normal position as illustrated in Figure 6, the cam 60 being raised by its handle 62 to occupy a position below the said yokes 30 and 31 when in the raised position while the adjacent lower edge of one side of the yokes seats in the notch or groove 64 in the periphery of the cam 60.

The yokes 30 and 31 are thereby held stationary while the cam 60 is in the normal position and the wiper motor is inoperative as the slide valve 41 is retained over the centre port 44 and the offside port 45 to impart vacuum to one side only of the diaphragm for the purpose described.

Figure 5 illustrates the cam mechanism when the wiper motor is operating, the cam 60 being disengaged from the spring controlled yokes 30 and 31 which are therefore free to energize the bell crank to actuate the slide valve 41 over the valve surface 42 to effect a pulsating movement to the diaphragm 6.

When the cam 60 is first released by its handle 62 from the spring controlled yokes 30 and 31, the spring 37 immediately energizes the said yokes which effect a snap-over movement to actuate the slide 41 to commence its cycle of operation to impart vacuum alternately to each side of the diaphragm.

By means of the cam mechanism described, the wiper may be started or stopped at will and in each application of the invention only one set of valve mechanism is necessary, the operation of which is controlled by the said cams and when the wiper motor is functioning the cams may be adjusted at any required instant to bring same into engagement with the valve mechanism which eliminates any further movement of the valve mechanism and vacuum is imparted to one side only of the diaphragm which draws the rod 17 inwardly to its maximum extent which returns the wiper to an upper inoperative position clear of the vision of the driver.

We desire it to be understood that the preceding description and the attached drawings merely define a practical embodiment of the invention as working improvements and modifications may be embodied without departing from the spirit and scope of the invention.

What we claim as our invention and desire to secure by Letters Patent is:—

1. In an improved wiper motor, a casing comprising two complemental sections, a diaphragm located between the complemental sections of said casing, a rod attached to said diaphragm to operate a wiper arm, spaced shoulders formed in said rod by a recess cut therein, snapover mechanism actuatable by said shoulders in said rod, an oscillatory slide valve, means connected with said mechanism for operating said slide valve, a valve seat over which said slide valve oscillates in operation, a series of spaced ports in said valve surface, the center one of which communicates with a source of suction while the side ports communicate with each side of the diaphragm, a cam pivotally mounted eccentrically adjacent to said valve seat, manually operable means for moving said cam to normally engage with said slide valve to retain the same stationary over the suction port and one of the side ports to permit the withdrawal of air from one side only of the diaphragm, and means in said cam to cover the other side port in said valve surface.

2. In an improved wiper motor, a casing comprising two complemental sections, a diaphragm located between the complemental sections of said casing, a rod attached to said diaphragm to operate a wiper arm, spring-controlled snapover yokes mounted on said casing and actuated by said rod, a bell crank pivoted to one of said yokes, an oscillatory slide valve connected to said bell crank, a valve seat formed on the casing underneath said slide valve, a series of spaced ports in said valve seat comprising a central suction supply port and spaced delivery ports, a cam with a recess therein pivotally mounted eccentrically adjacent to said valve seat, manually operable means for moving said cam relatively to the slide valve, the recess in said cam being adapted to normally cover the adjacent delivery port in the valve seat when the slide valve is retained over the main suction port and the other delivery port to withdraw air from one side only of the diaphragm.

3. In an improved wiper motor, a casing comprising two complemental sections, a diaphragm located between the complemental sections of said casing, a rod attached to said diaphragm to operate a wiper arm, spaced shoulders formed in said rod by a recess cut therein, spring-controlled snapover mechanism mounted on said casing to be actuated by said shoulders in said rod, an oscillatory slide valve operatively connected with said mechanism, a valve seat located underneath said slide valve, a series of spaced ports in said valve seat comprising a central suction supply port and spaced delivery ports, a cam with a recess therein pivotally and eccentrically mounted adjacent to the slide valve, a projecting knurled stem fitted to said cam for adjustment purposes, and an eccentric portion formed on said cam to extend across the valve seat to cover the adjacent delivery port therein and engage with the slide valve to retain the wiper motor inoperative.

4. In an improved wiper motor, a casing comprising two complemental sections, a diaphragm located between the complemental sections of said casing, a rod attached to said diaphragm to operate a wiper arm, spaced shoulders formed in said rod by a recess cut therein, spring controlled snapover yokes mounted on said casing and actuated by said shoulders, a bell crank connected to one of said yokes, an oscillatory slide valve connected to said bell crank, a cam pivotally mounted eccentrically in relation to said slide valve, a valve seat located underneath said slide valve, a series of spaced ports in said valve seat comprising a central suction supply port and spaced delivery ports, said cam having a recess therein to normally cover the adjacent delivery port and manually operable means to move said cam to release the slide valve to permit the wiper motor to start.

REGINALD ARTHUR POWELL. [L. S.]
ROY WILLIAM NEWTON. [L. S.]